United States Patent
Kajitani

(10) Patent No.: US 12,527,496 B2
(45) Date of Patent: Jan. 20, 2026

(54) GAIT MEASUREMENT DEVICE, ESTIMATION SYSTEM, GAIT MEASUREMENT METHOD, AND RECORDING MEDIUM

(71) Applicant: NEC Corporation, Tokyo (JP)

(72) Inventor: Hiroshi Kajitani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 287 days.

(21) Appl. No.: 18/383,225

(22) Filed: Oct. 24, 2023

(65) Prior Publication Data

US 2024/0245320 A1    Jul. 25, 2024

(30) Foreign Application Priority Data

Nov. 9, 2022 (JP) ................................. 2022-179514

(51) Int. Cl.
*A61B 5/11*      (2006.01)
*A61B 5/00*      (2006.01)

(52) U.S. Cl.
CPC ................ *A61B 5/112* (2013.01); *A61B 5/11* (2013.01); *A61B 5/1126* (2013.01); *A61B 5/6807* (2013.01); *A61B 2562/0219* (2013.01); *A61B 2562/06* (2013.01)

(58) Field of Classification Search
CPC ......... A61B 5/112; A61B 5/11; A61B 5/1126; A61B 5/6807; A61B 2562/0219; A61B 2562/06
See application file for complete search history.

(56) References Cited

U.S. PATENT DOCUMENTS

| | | | |
|---|---|---|---|
| 7,631,382 B2* | 12/2009 | DiBenedetto | A43B 5/06 |
| | | | 12/142 P |
| 7,857,772 B2* | 12/2010 | Bouvier | A63B 24/0021 |
| | | | 600/595 |
| 2007/0011919 A1* | 1/2007 | Case | A61B 5/6807 |
| | | | 36/132 |
| 2013/0142299 A1* | 6/2013 | Takemura | G04F 3/06 |
| | | | 377/19 |
| 2018/0070841 A1* | 3/2018 | Honore | A61B 5/02007 |
| 2022/0000431 A1* | 1/2022 | Huang | A61B 5/7275 |
| 2023/0040492 A1* | 2/2023 | Huang | A61B 5/6807 |
| 2024/0260855 A1* | 8/2024 | Kajitani | A61B 5/6829 |
| 2025/0127425 A1* | 4/2025 | Kajitani | A61B 5/11 |

FOREIGN PATENT DOCUMENTS

| JP | 2010-219976 A | 9/2010 |
|---|---|---|
| JP | 2013-117923 A | 6/2013 |
| JP | 2020-168281 A | 10/2020 |
| JP | 2022-013407 A | 1/2022 |

\* cited by examiner

*Primary Examiner* — Ryan D Walsh

(74) *Attorney, Agent, or Firm* — Sughrue Mion, PLLC

(57) ABSTRACT

A gait measurement device includes a first sensor that outputs an activation signal in response to detection of a magnetic field, a clock that generates a clock count value, a second sensor that measures a physical quantity related to movement of a foot, a control unit that is activated in response to the activation signal output from the first sensor to activate the clock and the second sensor, a data generation unit that generates sensor data using the physical quantity measured by the second sensor and generates measurement data associated with the clock count value and the sensor data at a timing when the physical quantity is measured, and an output unit that outputs the measurement data.

10 Claims, 14 Drawing Sheets

Fig.2
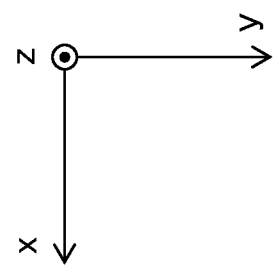
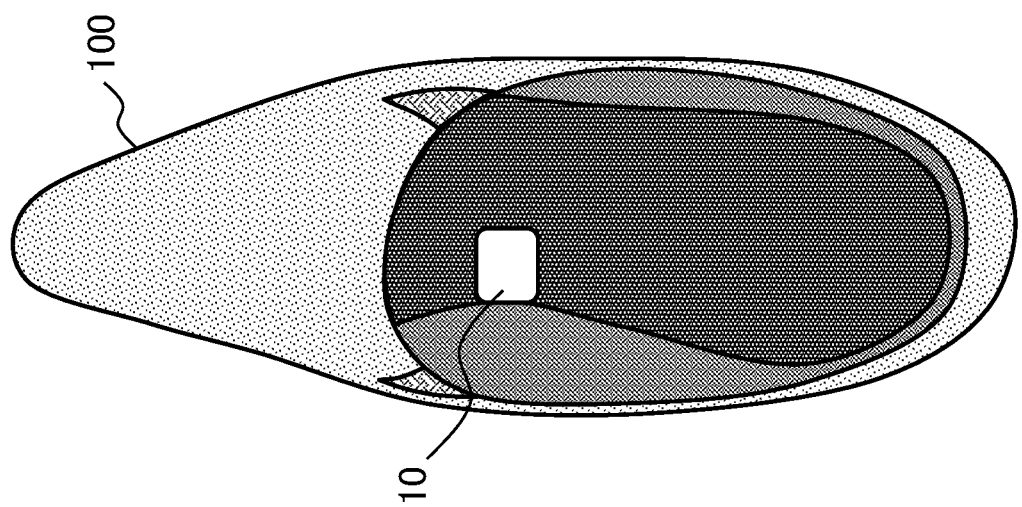
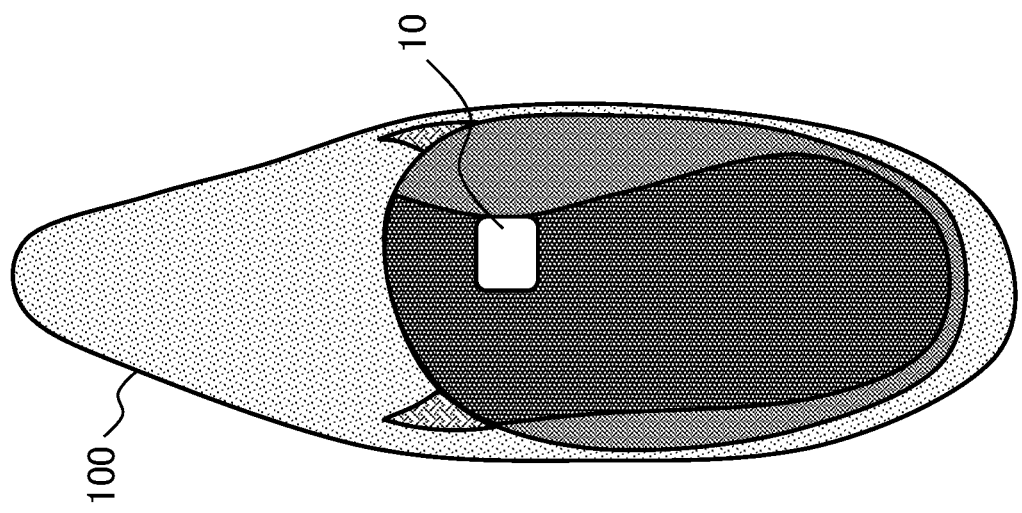

GAIT MEASUREMENT DEVICE, ESTIMATION SYSTEM, GAIT MEASUREMENT METHOD, AND RECORDING MEDIUM

This application is based upon and claims the benefit of priority from Japanese Patent Application No. 2022-179514, filed on Nov. 9, 2022, the disclosure of which is incorporated herein in its entirety by reference.

TECHNICAL FIELD

The present disclosure relates to a gait measurement device or the like that measures a gait.

BACKGROUND ART

With growing interest in healthcare, services that provide information according to gait have attracted attention. For example, a technique for analyzing a gait using sensor data measured by a sensor mounted on footwear such as shoes has been developed. In the time-series data of the sensor data, a feature associated with a walking event related to a physical condition appears. The physical condition of the subject can be estimated by analyzing the walking data including the features associated with the walking event.

Patent Literature 1 (JP 2020-168281 A) discloses a gait analysis system including a pressure detection device, a gait analysis device, and a display device. The gait analysis device detects a first step in walking of the subject using the pressure signal output from the pressure detection device. The gait analysis device analyzes the state of the subject based on the sole data regarding the pressure of the sole of the foot in the first step.

Patent Literature 2 (JP 2013-117923 A) discloses a timer device capable of selecting a measurement mode. The device of Patent Literature 2 can select between a single mode in which measurement is performed only once and a repeat mode in which measurement is repeatedly performed at a constant cycle. In the device of Patent Literature 2, a counting circuit outputs a measurement end signal according to the end of the counting of the setting value, thereby achieving the single mode. The device of Patent Literature 2 achieves a repeat mode in which the output of the measurement end signal is terminated in response to the input of the predetermined signal to the first external terminal, and the predetermined signal is input in synchronization with the measurement end signal to periodically output the measurement end signal.

Patent Literature 3 (JP 2010-219976 A) discloses a communication system that measures the number of walks. The system of Patent Literature 3 includes a first communication device and a second communication device. The first communication device is mounted at a position away from the road surface. The second communication device is mounted at a position near the road surface. The second communication device measures the number of walks according to a change in the intensity of the electric field signal at the timing when the electrode is electrically grounded to the road surface. The first communication device and the second communication device communicate with a human body as a signal transmission path.

Patent Literature 4 (JP 2022-013407 A) discloses a risk estimation device that estimates a risk relating to a foot. The device of Patent Literature 4 acquires measurement data of foot pressure measured by sensors provided on left and right shoes. The device of Patent Literature 4 specifies the start and end timings of the stance phase for the left and right feet using the measurement data of the foot pressure. The device of Patent Literature 4 estimates a lower limb abnormality risk based on the asymmetry of the foot pressure regarding the left and right feet in the stance phase.

The sensor mounted on the footwear needs to be activated by an instruction from the outside or activated at a preset time. Practically, it is required to start the measurement of the gait in accordance with the walking motion of the user. In such a case, it is necessary to transmit an instruction to activate the gait measurement device using a terminal device such as a smartphone.

The system of Patent Literature 1 starts measurement of a gait in response to detection of a pressure by the pressure detection device. However, in the method of Patent Literature 1, the measurement of the gait cannot be started unless the pressure by the pressure detection device can be detected.

The device of Patent Literature 2 can start measurement at a constant cycle by receiving a signal instructing start of measurement from the outside. However, the device of Patent Literature 2 cannot start measurement at any timing unless a signal instructing start of measurement is received from the outside.

The system of Patent Literature 3 measures the number of walks according to a change in the intensity of the electric field signal at the timing when the electrode of the second communication device is electrically grounded to the road surface. Therefore, the system of Patent Literature 3 cannot measure the number of walks unless the electrode of the second communication device is electrically connected to the road surface.

The device of Patent Literature 4 detects the start and end timings of the stance phase based on the measurement data of the foot pressure. Therefore, the device of Patent Literature 4 cannot detect the start of walking unless the foot pressure can be measured.

An object of the present disclosure is to provide a gait measurement device or the like capable of starting measurement of a gait in accordance with a walking motion of a user without communicating with the outside.

SUMMARY

A gait measurement device according to one aspect of the present disclosure includes a first sensor that outputs an activation signal in response to detection of a magnetic field, a clock that generates a clock count value, a second sensor that measures a physical quantity related to movement of a foot, a control unit that is activated in response to the activation signal output from the first sensor to activate the clock and the second sensor, a data generation unit that generates sensor data using the physical quantity measured by the second sensor and generates measurement data associated with the clock count value and the sensor data at a timing when the physical quantity is measured, and an output unit that outputs the measurement data.

A gait measurement method according to one aspect of the present disclosure is a gait measurement method using a gait measurement device including a first sensor that outputs an activation signal in response to detection of a magnetic field, a clock that generates a clock count value, and a second sensor that measures a physical quantity related to movement of a foot. The gait measurement method includes: activating the clock and the second sensor in response to the activation signal output from the first sensor, generating sensor data using the physical quantity measured by the second sensor, generating measurement data associated with the clock count value and the sensor data at a timing when the physical quantity is measured, and outputting the measurement data.

A program according to one aspect of the present disclosure is a program for gait measurement using a gait measurement device including a first sensor that outputs an activation signal in response to detection of a magnetic field, a clock that generates a clock count value, and a second sensor that measures a physical quantity related to movement of a foot. The program causes a computer to execute: activating the clock and the second sensor in response to the activation signal output from the first sensor, generating sensor data using the physical quantity measured by the second sensor, generating measurement data associated with the clock count value and the sensor data at a timing when the physical quantity is measured, and outputting the measurement data.

BRIEF DESCRIPTION OF THE DRAWINGS

Exemplary features and advantages of the present invention will become apparent from the following detailed description when taken with the accompanying drawings in which:

FIG. 2 is a conceptual diagram illustrating an arrangement example of the gait measurement device in this disclosure;

EXAMPLE EMBODIMENT

Figure 1:
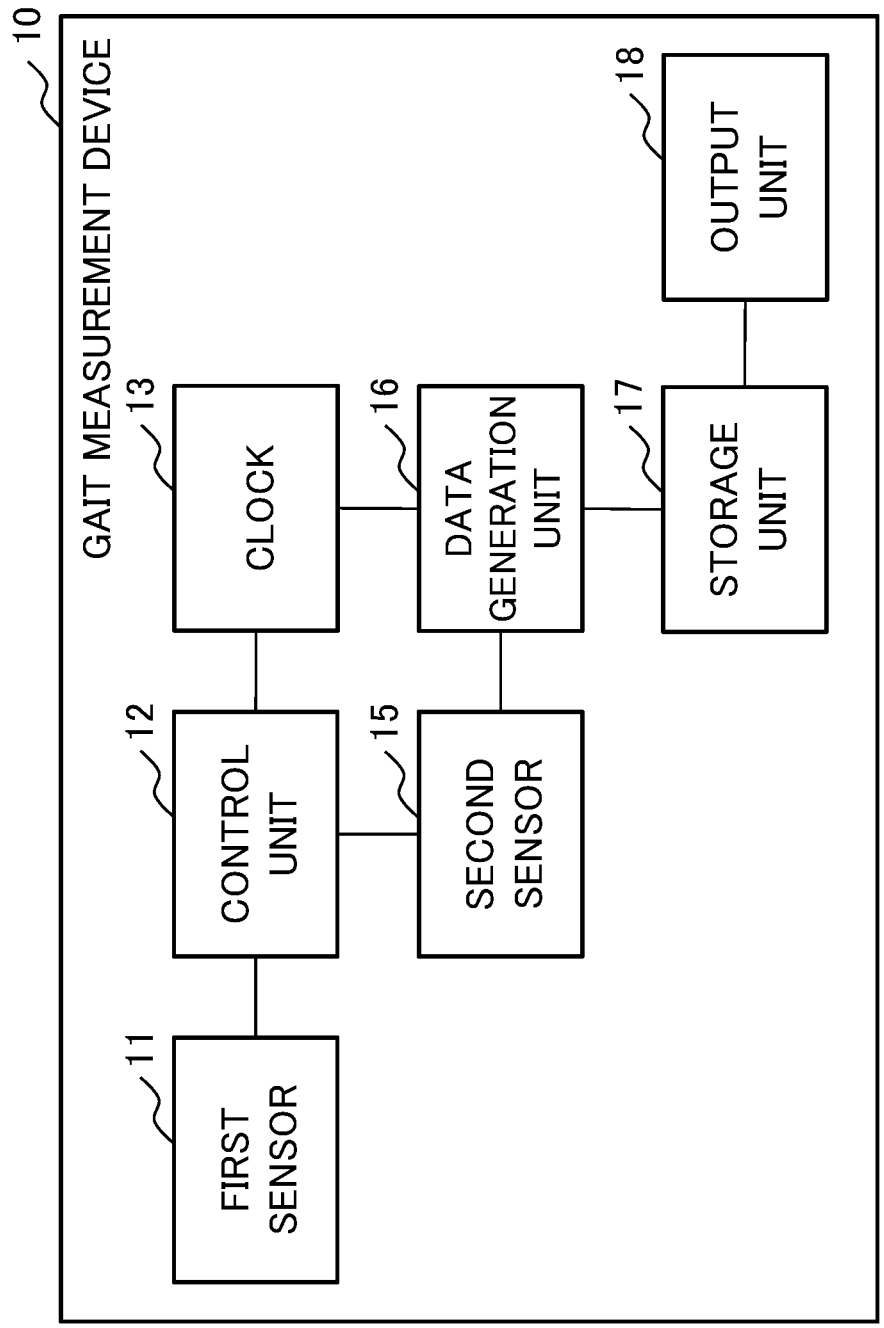
FIG. 1 is a block diagram illustrating an example of a configuration of a gait measurement device in this disclosure.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, a configuration of a gait measurement device according to a first example embodiment will be described with reference to the drawings. The gait measurement device of the present example embodiment is installed on footwear such as shoes. The gait measurement device of the present example embodiment measures sensor data according to a physical quantity related to the movement of the foot according to the walking of the subject. The gait measurement device of the present example embodiment starts measurement using a reference line such as a magnetic tape or an electric wire arranged in advance.

(Configuration)

FIG. 1 is a block diagram illustrating an example of a configuration of a gait measurement device 10 according to the present example embodiment. The gait measurement device 10 includes a first sensor 11, a control unit 12, a clock 13, a second sensor 15, a data generation unit 16, a storage unit 17, and an output unit 18. The gait measurement device 10 includes a microcomputer and a microcontroller that perform control and data processing of the first sensor 11 and the second sensor 15. For example, the gait measurement device 10 includes a central processing unit (CPU), a random access memory (RAM), a read only memory (ROM), and the like.

FIG. 2 is a conceptual diagram illustrating an example in which the gait measurement device 10 is arranged in the shoes 100 of both feet. In the example of FIG. 2, the gait measurement device 10 is installed at a position corresponding to the back side of the arch of foot. The gait measurement device 10 may be installed at a position other than the back side of the arch of foot as long as sensor data regarding the movement of the foot can be measured. For example, the gait measurement device 10 is arranged in an insole inserted into the shoe 100. The gait measurement device 10 may be arranged on the bottom surface of the shoe 100. The gait measurement device 10 may be embedded in the main body of the shoe 100. The gait measurement device 10 may be detachable from the shoe 100 or may not be detachable from the shoe 100. The gait measurement device 10 may be installed on a sock worn by the user or a decorative article such as an anklet worn by the user. The gait measurement device 10 may be directly attached to the foot or may be embedded in the foot. FIG. 2 illustrates an example in which the gait measurement device 10 is installed on the shoes 100 of both feet. The gait measurement device 10 may be installed in the shoe 100 of one foot.

The first sensor 11 is a magnetic sensor that detects an electromagnetic field. An output terminal of the first sensor 11 is connected to an interrupt signal input terminal of the control unit 12. For example, the first sensor 11 detects a change in an electromagnetic field. The first sensor 11 outputs an activation signal in response to detection of an electromagnetic field. The activation signal may be either an HI signal or an LO signal. For example, the first sensor 11 is achieved by a magnetic sensor such as a magneto resistive (MR) sensor element, a Hall element, a coil, or a reed switch. For example, the first sensor 11 is achieved by an anisotropic magnetoresistance (AMR) sensor element using an effect of AMR.

The control unit 12 receives the activation signal output from the first sensor 11. The interrupt signal input terminal of the control unit 12 is connected to the output terminal of the first sensor 11. The control unit 12 is activated in response to the input of the activation signal. The control unit 12 activates the clock 13 and the second sensor in response to the input of the activation signal. For example, the control unit 12 is achieved by a CPU.

The clock 13 generates a clock count value. The clock 13 outputs the generated clock count value to the data generation unit 16. The clock 13 is not particularly limited as long as it is an element that outputs a clock count value. For example, the clock 13 is achieved by a clock transmitter including a crystal oscillator.

The second sensor 15 is a sensor that measures a physical quantity corresponding to the movement of the foot. The second sensor 15 outputs the measured physical quantity to the data generation unit 16. For example, the second sensor 15 measures a physical quantity corresponding to the movement of the foot such as acceleration or angular velocity.

Figure 3:
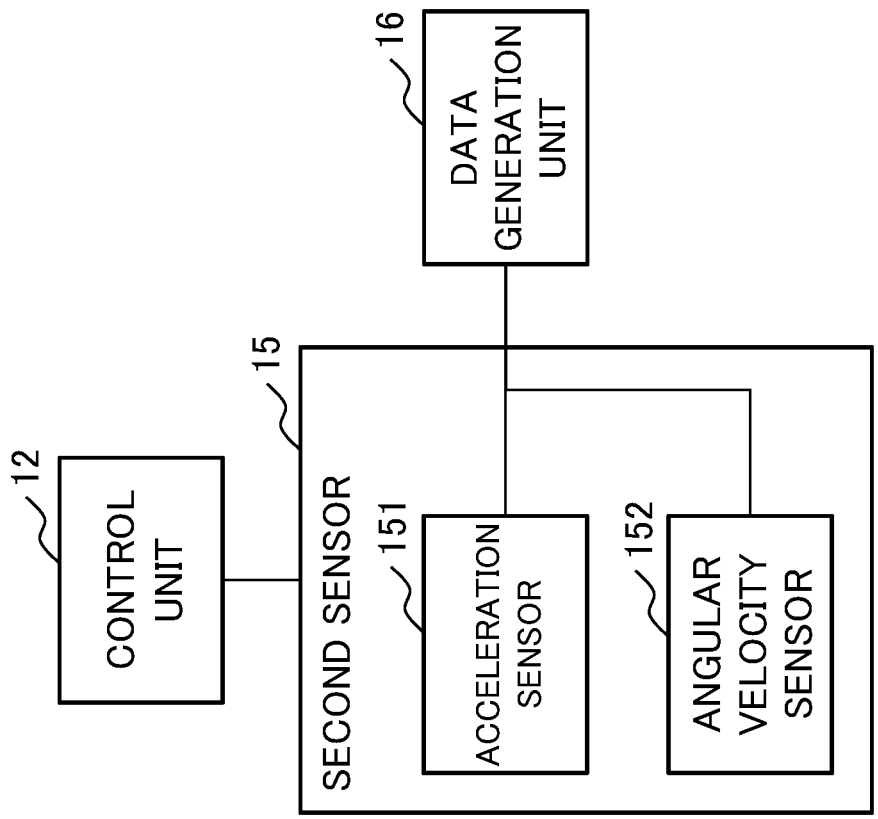
FIG. 3 is a block diagram illustrating an example of a configuration of a second sensor included in the gait measurement device in this disclosure.

FIG. 3 is a block diagram illustrating an example of a configuration of the second sensor 15. The second sensor 15 includes an acceleration sensor 151 and an angular velocity sensor 152. FIG. 3 illustrates an example in which the second sensor 15 includes the acceleration sensor 151 and the angular velocity sensor 152. The second sensor 15 may include a sensor other than the acceleration sensor 151 and the angular velocity sensor 152.

The acceleration sensor 151 is a sensor that measures accelerations (also referred to as spatial accelerations) in three axial directions. The acceleration sensor 151 measures acceleration (also referred to as spatial acceleration) as a physical quantity related to the movement of the foot. The acceleration sensor 151 outputs the measured acceleration to the data generation unit 16. For example, a sensor of a piezoelectric type, a piezoresistive type, a capacitance type, or the like can be used as the acceleration sensor 151. The sensor used as the acceleration sensor 151 is not limited to the measurement type as long as the sensor can measure acceleration.

The angular velocity sensor 152 is a sensor that measures an angular velocity (also referred to as a spatial angular velocity) about three axes. The angular velocity sensor 152 measures an angular velocity (also referred to as a spatial angular velocity) as a physical quantity related to the movement of the foot. The angular velocity sensor 152 outputs the measured angular velocity to the data generation unit 16. For example, a sensor of a vibration type, a capacitance type, or the like can be used as the angular velocity sensor 152. The sensor used as the angular velocity sensor 152 is not limited to the measurement type as long as the sensor can measure the angular velocity.

The second sensor 15 is achieved by, for example, an inertial measurement device that measures acceleration and angular velocity. An example of the inertial measurement device is an inertial measurement unit (IMU). The IMU includes the acceleration sensor 151 that measures accelerations in three axial directions and the angular velocity sensor 152 that measures angular velocitys around the three axes. The second sensor 15 may be achieved by an inertial measurement device such as a vertical gyro (VG) or an attitude heading reference system (AHRS). The second sensor 15 may be achieved by Global Positioning System/Inertial Navigation System (GPS/INS). The second sensor 15 may be achieved by a device other than the inertial measurement device as long as it can measure a physical quantity related to the movement of the foot.

In the example of FIG. 2, a local coordinate system including the x axis in the left-right direction, the y axis in the traveling direction, and the z axis in the vertical direction is set with reference to the gait measurement device 10 (second sensor 15). In the example of FIG. 2, the x axis is positive on the left, the y axis is positive on the rear, and the z axis is positive on the top. The orientation of the axis set to the gait measurement device 10 may be the same for the left and right feet, or may be different for the left and right feet. For example, in a case where the gait measurement devices 10 produced with the same specification are arranged in the left and right shoes 100, the vertical orientations (orientations in the Z-axis direction) of the gait measurement devices 10 arranged in the left and right shoes 100 are the same. In this case, the three axes of the local coordinate system related to the sensor data derived from the left foot and the three axes of the local coordinate system related to the sensor data derived from the right foot are the same on the left and right. In a case where the gait measurement devices 10 produced with different specifications on the left and right are arranged in the shoes 100, the vertical orientations (orientations in the Z-axis direction) of the gait measurement devices 10 arranged on the left and right shoes 100 may be different orientations. In this case, the three axes of the local coordinate system related to the sensor data derived from the left foot and the three axes of the local coordinate system related to the sensor data derived from the right foot are different on the left and right.

Figure 4:
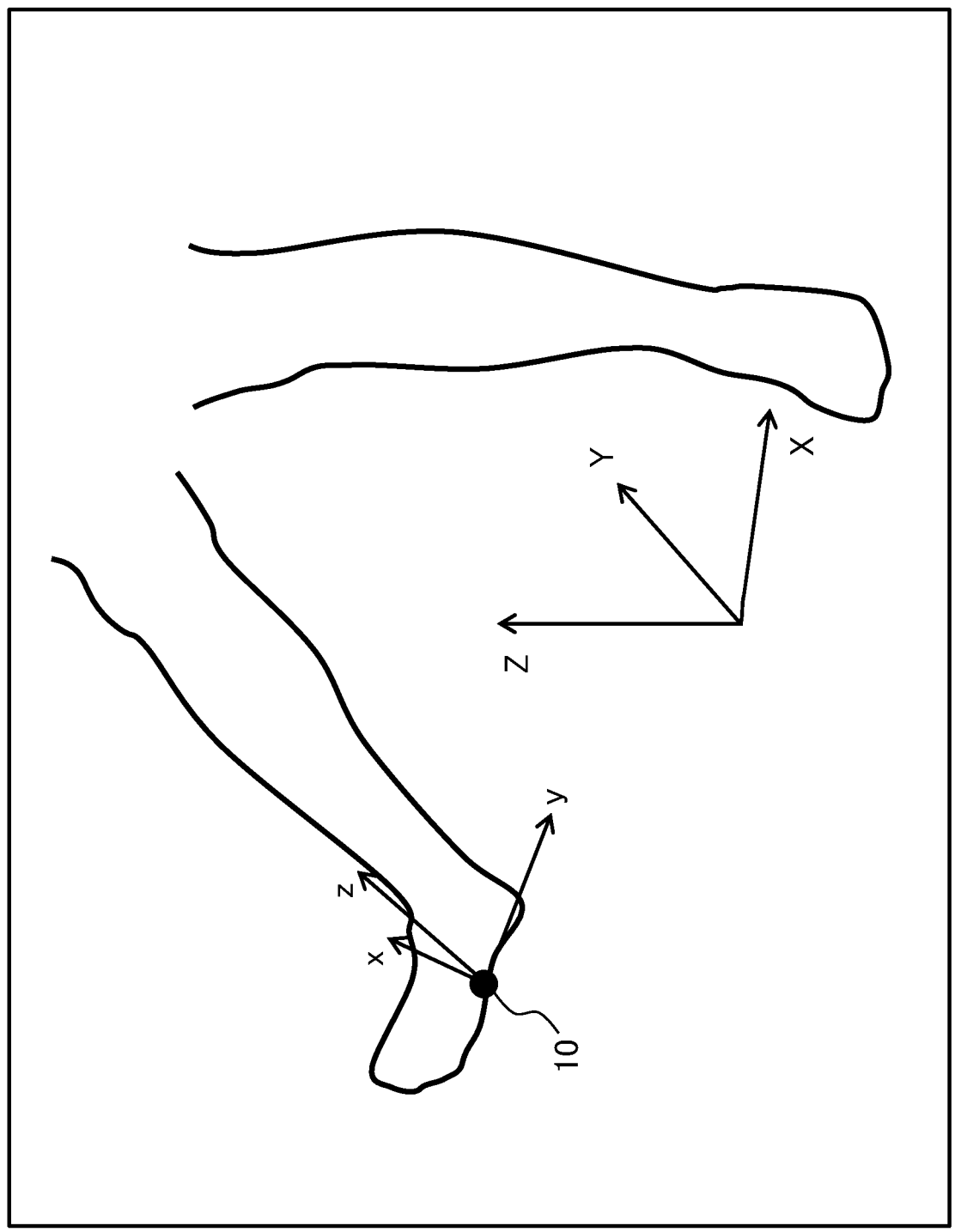
FIG. 4 is a conceptual diagram for explaining a coordinate system set to the gait measurement device in this disclosure.

FIG. 4 is a conceptual diagram for explaining a local coordinate system set to the gait measurement device 10 (second sensor 15) installed on the back side of the arch of foot and a world coordinate system set with respect to the ground. In the world coordinate system (X axis, Y axis, Z axis), in a state where the user facing the traveling direction is upright, the lateral direction of the user is set to the X-axis direction (the leftward orientation is positive), the direction of the back surface of the user is set to the Y-axis direction (the rearward orientation is positive), and the gravity direction is set to the Z-axis direction (the vertically upward orientation is positive). The example of FIG. 4 conceptually illustrates the relationship between the local coordinate system and the world coordinate system, and does not accurately illustrate the relationship between the local coordinate system and the world coordinate system that varies depending on the walking of the user.

The data generation unit 16 acquires a physical quantity related to the movement of the foot measured by the second sensor. The data generation unit 16 acquires the clock count value generated by the clock 13. The data generation unit 16 generates sensor data in which a physical quantity and a clock count value are associated with each other. The data generation unit 16 outputs the generated sensor data to the output unit 18. For example, the data generation unit 16 may extract a feature amount regarding walking from the generated sensor data. In this case, the data generation unit 16 outputs the extracted feature amount to the output unit 18.

Figure 5:
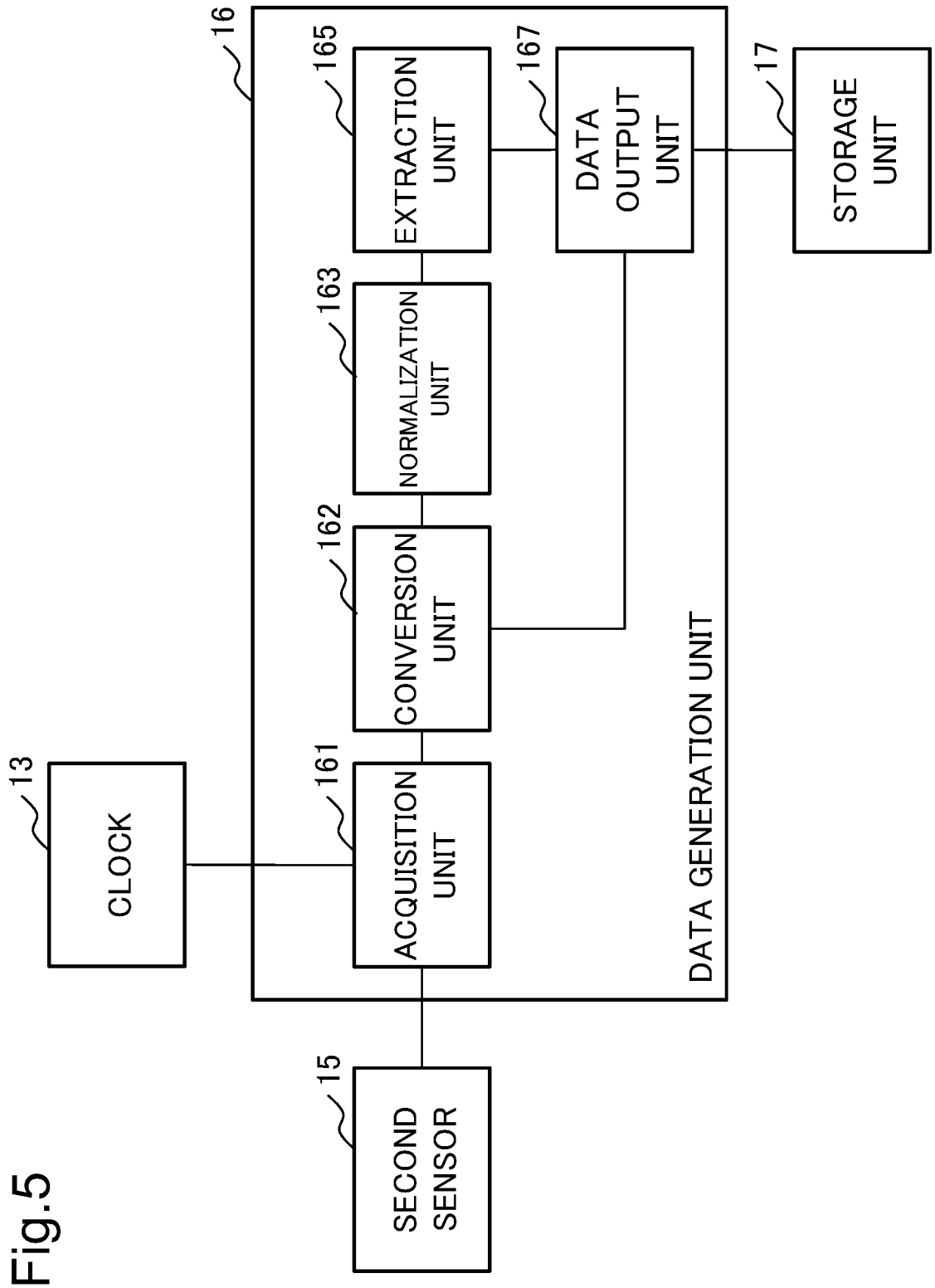
FIG. 5 is a block diagram illustrating an example of a configuration of a data generation unit included in the gait measurement device in this disclosure.

FIG. 5 is a block diagram illustrating an example of a configuration of the data generation unit 16. The configuration of FIG. 5 is a configuration for extracting a feature amount from sensor data. The data generation unit 16 includes an acquisition unit 161, a conversion unit 162, a normalization unit 163, an extraction unit 165, and a data output unit 167. In a case where the sensor data is output from the output unit 18, the normalization unit 163 and the extraction unit 165 can be omitted from the data generation unit 16.

The acquisition unit 161 acquires a measurement value from the second sensor 15. Specifically, the acquisition unit 161 acquires accelerations in three axial directions from the acceleration sensor 151. The acquisition unit 161 acquires angular velocities around three axes from the angular velocity sensor 152. Further, the acquisition unit 161 acquires the clock count value from the clock 13.

The conversion unit 162 converts the acquired measurement values of the acceleration and the angular velocity into sensor data. The conversion unit 162 associates a clock count value at a timing at which a measurement value serving as a base of the sensor data is measured with the converted sensor data. The conversion unit 162 outputs the sensor data associated with the clock count value to the normalization unit 163. In a case where the feature amount is not extracted from the sensor data, the conversion unit 162 outputs the sensor data associated with the clock count value to the normalization unit 163.

For example, the conversion unit 162 performs analog-to-digital conversion (AD conversion) on the acquired physical quantities (analog data) such as angular velocity and acceleration. The physical quantity (analog data) measured by the acceleration sensor 151 and the angular velocity sensor 152 may be configured to be converted into digital data in each of the acceleration sensor 151 and the angular velocity sensor 152. The conversion unit 162 outputs the converted digital data (also referred to as sensor data) to the normalization unit 163 in association with the clock count value. The conversion unit 162 may be configured to store the sensor data in a storage unit (not illustrated). The sensor data includes at least acceleration data converted into digital data and angular velocity data converted into digital data. The acceleration data includes acceleration vectors in three axial directions. The angular velocity data includes angular velocity vectors around three axes. The conversion unit 162 may add correction such as a mounting error, temperature correction, and linearity correction to the acceleration data and the angular velocity data.

The normalization unit 163 acquires the sensor data associated with the clock count value from the conversion unit 162. The normalization unit 163 extracts time-series data (also referred to as walking waveform data) for one gait cycle from the time-series data of the acceleration in the three-axis direction and the angular velocity around the three axes included in the sensor data. The normalization unit 163 normalizes (also referred to as first normalization) the time of the extracted walking waveform data for one gait cycle to a gait cycle of 0 to 100% (percent). Timing such as 1% or 10% included in the 0 to 100% gait cycle is also referred to as a walking phase. The normalization unit 163 normalizes (also referred to as second normalization) the first normalized walking waveform data for one gait cycle so that the stance phase becomes 60% and the swing phase becomes 40%. The stance phase is a period in which at least a part of the back side of the foot is in contact with the ground. The swing phase is a period in which the back side of the foot is away from the ground. By performing the second normalization on the walking waveform data, it is possible to equalize the unsteadiness of walking in the time direction over a plurality of gait cycles.

Figure 6:
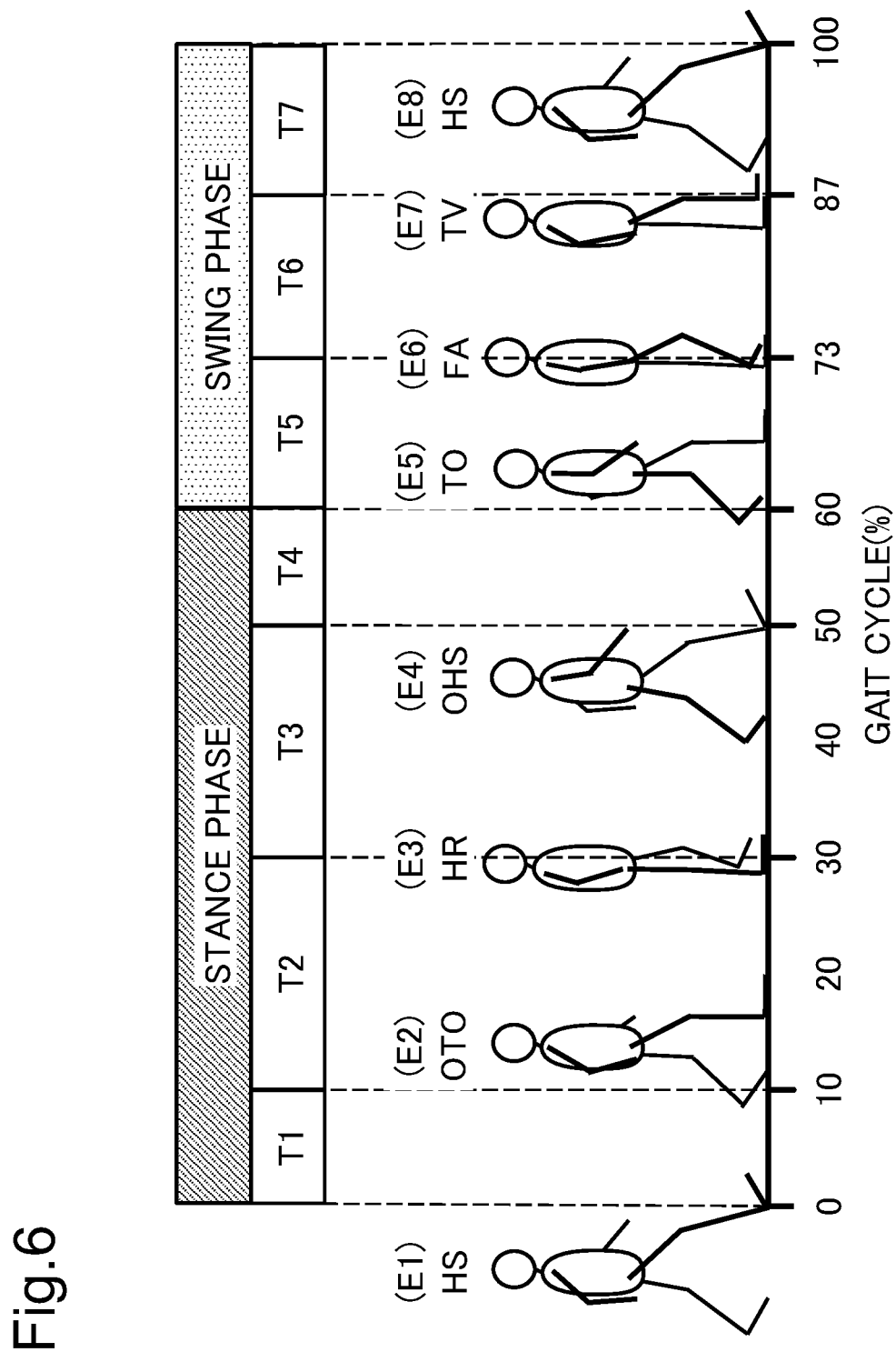
FIG. 6 is a conceptual diagram for explaining a gait cycle in this disclosure.

FIG. 6 is a conceptual diagram for explaining one gait cycle based on the right foot. One gait cycle based on the left foot is also similar to that of the right foot. The horizontal axis of FIG. 6 is one gait cycle of the right foot with a time point at which the heel of the right foot lands on the ground as a start point and a time point at which the heel of the right foot next lands on the ground as an end point. The horizontal axis in FIG. 6 is the first normalized value with one gait cycle as 100%. In the horizontal axis of FIG. 6, the second normalization is performed such that the stance phase is 60% and the swing phase is 40%. The one gait cycle of one foot is roughly divided into a stance phase in which at least a part of the back side of the foot is in contact with the ground and a swing phase in which the back side of the foot is separated from the ground. The stance phase is subdivided into a loading response period T1, a mid-stance period T2, a terminal stance period T3, and a pre-swing period T4. The swing phase is subdivided into an initial swing period T5, a mid-swing period T6, and a terminal swing period T7. FIG. 6 is an example, and does not limit the periods constituting one gait cycle, the names of these periods, and the like.

As illustrated in FIG. 6, in walking, a plurality of events (also referred to as walking events) occur. E1 represents an event in which the heel of the right foot touches the ground (HS: heel strike). E2 represents an event in which the toe of the left foot is separated from the ground with the sole of the right foot in contact with the ground (ONO: opposite toe off). E3 represents an event in which the heel of the right foot lifts with the sole of the right foot in contact with the ground (HR: Heel Rise). E4 is an event in which the heel of the left foot touches the ground (OHS: Opposite Heel Strike). E5 represents an event in which the toe of the right foot is separated from the ground in a state with the sole of the left foot in contact with the ground (TO: Toe Off). E6 represents an event in which the left foot and the right foot cross with the sole of the left foot in contact with the ground (FA: Foot Adjacent). E7 represents an event that the tibia of the right foot is approximately perpendicular to the ground with the sole of the left foot in contact with the ground (TV: Tibia Vertical). E8 represents an event in which the heel of the right foot touches the ground (HS: Heel Strike). E8 corresponds to the end point of the gait cycle starting from E1 and corresponds to the start point of the next gait cycle. FIG. 6 is an example, and does not limit events that occur during walking or names of these events.

For example, from the time-series data (solid line) of the acceleration in the traveling direction (acceleration in the Y direction), it is possible to detect a walking event such as the heel strike HS and the toe off TO. The timing of the walking event is a timing at which a specific peak appears in the time-series data of the acceleration in the traveling direction (acceleration in the Y direction). For example, the timing of the mid-stance period can be detected from the time-series data (broken line) of the roll angle (angular velocity around the X axis). The timing at the midpoint between the timing at which the roll angle is minimum and the timing at which the roll angle is maximum corresponds to the mid-stance period. For example, parameters (also referred to as gait parameters) such as walking speed, stride, minute, medial/lateral rotation, and plantarflexion/dorsiflexion can be obtained with reference to the mid-stance period.

The extraction unit 165 acquires walking waveform data for one gait cycle normalized by the normalization unit 163. The extraction unit 165 extracts a feature amount from the walking waveform data for one gait cycle. The extraction unit 165 extracts a feature amount based on a preset condition. For example, the extraction unit 165 extracts a feature amount used for estimating the physical condition from the walking waveform data for one gait cycle.

The data output unit 167 stores feature amount data regarding the feature amount extracted by the extraction unit 165 in the storage unit 17. In a case where the feature amount is not extracted from the sensor data, the data output unit 167 stores the sensor data in the storage unit 17. Hereinafter, the feature amount data and the sensor data are collectively referred to as measurement data.

The storage unit 17 stores the measurement data output from the data generation unit 16. For example, the storage unit 17 is achieved by a memory such as a RAM or a ROM. The storage unit 17 may be achieved by a storage device other than a memory such as a RAM or a ROM. The measurement data generated by the data generation unit 16 may be output from the output unit 18 without being stored in the storage unit 17. In that case, the storage unit 17 may be omitted.

The output unit 18 outputs the measurement data recorded in the storage unit 17 at the transmission timing. For example, the output unit 18 transmits the measurement data via wireless communication. The use of the measurement data output from the output unit 18 is not limited. For example, the measurement data is used to estimate the physical condition of the subject. The transmission timing of the measurement data is not limited. For example, the transmission timing of the measurement data is set in advance. For example, the output unit 18 may transmit the measurement data in response to an instruction from a terminal device such as a mobile terminal communicably connected to the gait measurement device 10.

(Detection Example)

Next, detection of the start of walking by the gait measurement device 10 will be described with two detection examples. The first detection example (detection example 1) is an example in which a magnetic tape is used as a reference line serving as a start line for starting measurement. The second detection example (detection example 2) is an example in which an electric wire is used as a reference line serving as a start line for starting measurement. The reference line is a member for detecting the start of walking of the subject wearing the gait measurement device 10. A system in which the gait measurement device 10 and the reference line are combined is referred to as an estimation system. Hereinafter, detection example 1 and detection example 2 will be individually described.

Detection Example 1

Figure 7:
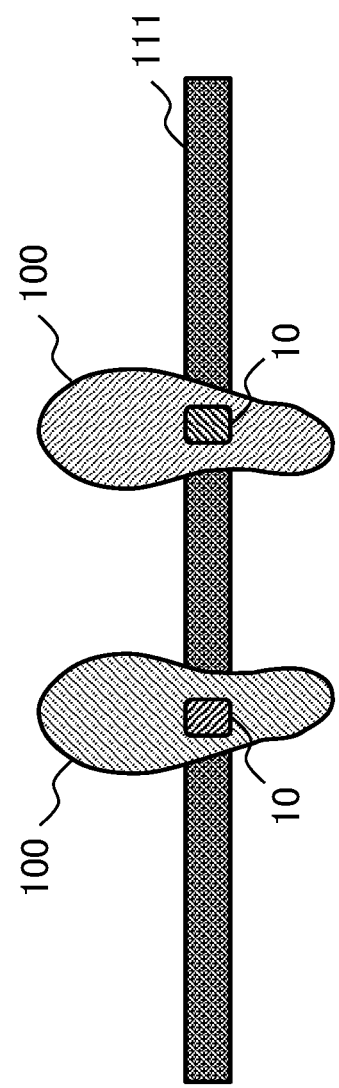
FIG. 7 is a conceptual diagram illustrating a detection example of walking start by the gait measurement device in this disclosure.

FIG. 7 is a conceptual diagram for explaining detection example 1. In the present detection example, a magnetic tape 111 is used as a reference line. The magnetic tape 111 is a magnetic belt-shaped member. The magnetic tape 111 includes a permanent magnet. The type and form of the permanent magnet included in the magnetic tape 111 are not particularly limited.

In the present detection example, the magnetic field around the magnetic tape 111 is detected by the first sensor 11 built in the gait measurement device 10. The subject whose gait is to be measured wears the shoes 100 to which the gait measurement device 10 is attached. The subject stands upright with his/her feet on the magnetic tape 111. For example, the subject stands upright with both feet aligned on the magnetic tape 111 according to an instruction of a measurer such as a physical therapist or a doctor. For example, in response to the detection of the gait measurement device 10 in the vicinity of the magnetic tape 111, a voice instructing to stand upright with both feet aligned on the magnetic tape 111 may be output. For example, a mark such as a foot shape may be displayed on the magnetic tape 111 using a projector in response to detection of the gait measurement device 10 in the vicinity of the magnetic tape 111. If a measurement instruction is issued by voice or display, the gait measurement can be automatically started even if there is no measurer.

When the subject starts walking, an activation signal is output from the first sensor 11 of the gait measurement device 10 attached to the shoe 100 of the foot that has started moving according to the change in the magnetic field. Therefore, the measurement of the clock count value of the gait measurement device 10 attached to the shoe 100 of the foot that has started to move is started. That is, according to the present detection example, the measurement by the gait measurement device 10 worn on the shoe 100 can be started according to the movement of the foot without communicating with the outside.

Detection Example 2

Figure 8:
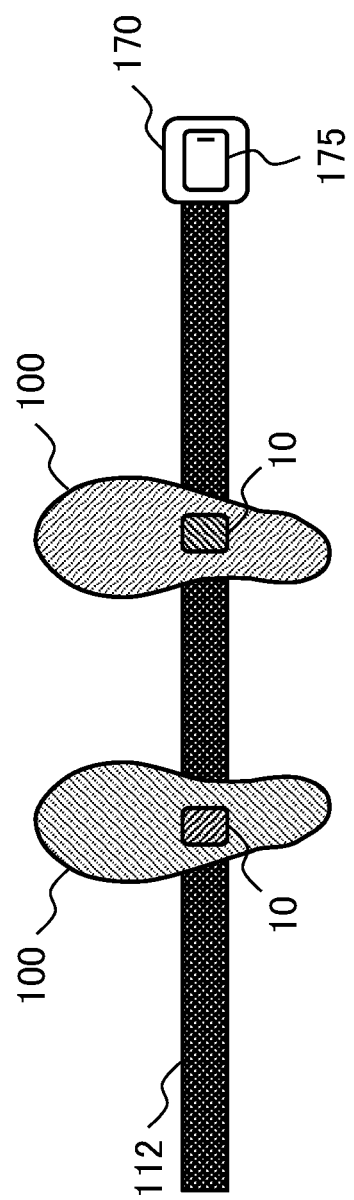
FIG. 8 is a conceptual diagram illustrating a detection example of walking start by the gait measurement device in this disclosure.

FIG. 8 is a conceptual diagram for explaining detection example 2. In the present detection example, an electric wire 112 is set as a reference line. A power supply 170 is connected to the electric wire 112. By turning on a switch 175 of the power supply 170, the electric wire 112 is energized. The electric wire 112 is not particularly limited as long as it is a conductive member.

In the present detection example, the magnetic field around the energized electric wire 112 is detected by the first sensor 11 built in the gait measurement device 10. The subject whose gait is to be measured wears the shoes 100 to which the gait measurement device 10 is attached. The subject stands upright with both feet aligned on the electric wire 112 in a state where the switch 175 is not turned on. For example, the subject stands upright with both feet aligned on the electric wire 112 according to an instruction of a measurer such as a physical therapist or a doctor. The measurer turns on the switch 175 of the power supply 170 at the timing when the subject starts walking. The switch 175 of the power supply 170 may be operated according to the operation of the subject.

When the magnetic field generated is detected in response to the energization of the electric wire 112, the activation signals are output at the same timing from the first sensors 11 of the gait measurement device 10 attached to the left and right shoes 100. Therefore, the clock count values of the gait measurement device 10 attached to the left and right shoes 100 are synchronized. That is, according to the present detection example, not only the measurement by the gait measurement device 10 attached to the shoe 100 can be started without communicating with the outside, but also the time of the gait measurement device 10 attached to the shoe 100 can be synchronized.

(Operation)

Figure 9:
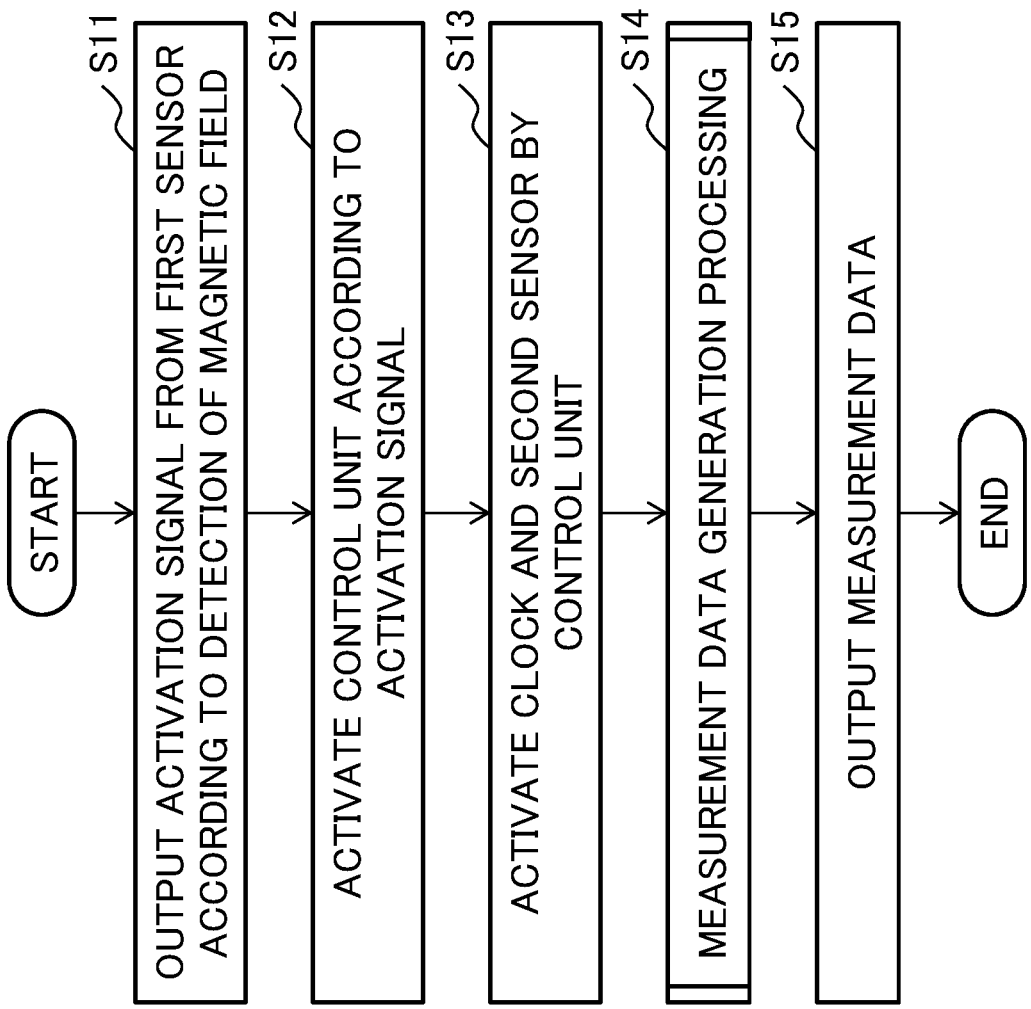
FIG. 9 is a flowchart for explaining an example of an operation of the gait measurement device in this disclosure.

Next, an example of an operation (gait measurement method) of the gait measurement device 10 will be described with reference to the drawings. FIG. 9 is a flowchart for explaining the operation of the gait measurement device 10. In the description along the flowchart of FIG. 9, the components of the gait measurement device 10 are set as the operation subject.

In FIG. 9, the first sensor 11 outputs the activation signal in response to the detection of the magnetic field (step S11). The activation signal is input to the control unit 12.

Next, the control unit 12 is activated according to the activation signal (step S12).

Next, the activated control unit 12 activates the clock 13 and the second sensor 15 (step S13). In response to the activation, the clock 13 begins generating a clock count value. In response to the activation, the second sensor 15 starts measuring a physical quantity related to the movement of the foot.

Next, the data generation unit 16 executes measurement data generation processing (step S14). Details of the measurement data generation processing will be described later. The measurement data generated in the measurement data generation processing in step S14 is stored in the storage unit 17.

Next, the output unit 18 outputs the measurement data stored in the storage unit 17 (step S15).

[Measurement Data Generation Processing]

Figure 10:
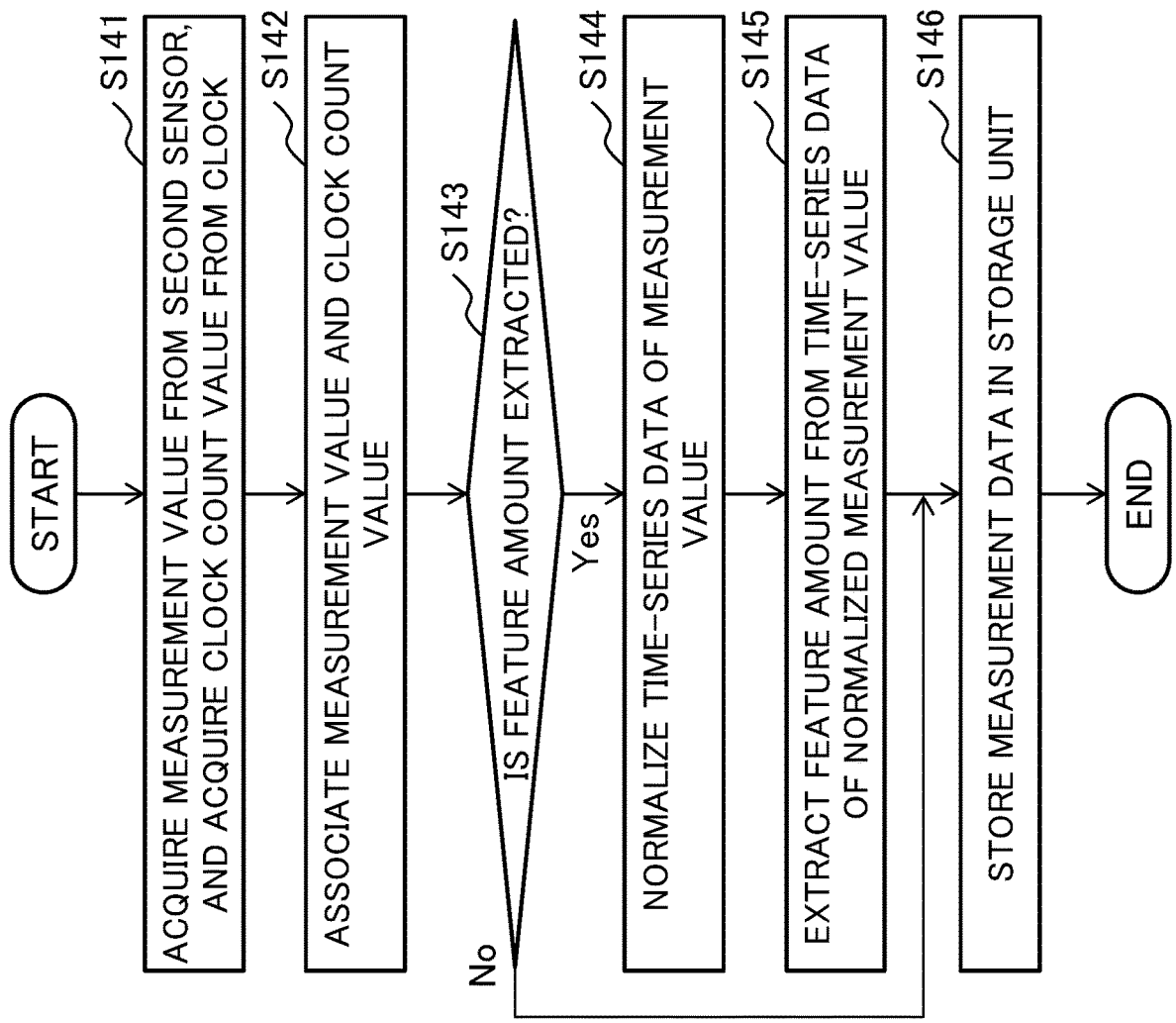
FIG. 10 is a flowchart for explaining an example of measurement data generation processing by the data generation unit of the gait measurement device in this disclosure.

Next, measurement data generation processing in step S14 in FIG. 9 will be described with reference to the drawings. FIG. 10 is a flowchart for explaining the measurement data generation processing. In the description along the flowchart of FIG. 10, the data generation unit 16 will be described as an operation subject.

In FIG. 10, the data generation unit 16 acquires the measurement value from the second sensor 15 and acquires the clock count value from the clock 13 (step S141).

Next, the data generation unit 16 associates the measurement value with the clock count value (step S142).

Next, in a case where the feature amount is extracted (Yes in step S143), the data generation unit 16 normalizes the time-series data of the measurement value (step S144). When the feature amount is not extracted (No in step S143), the process proceeds to step S146.

After step S144, the data generation unit 16 extracts a feature amount from the normalized time-series data of the measurement value (step S145).

After step S144 or in the case of No in step S143, the data generation unit 16 stores the measurement data in the storage unit 17 (step S146).

As described above, the gait measurement device of the present example embodiment includes the first sensor, the control unit, the clock, the second sensor, the data generation unit, the storage unit, and the output unit. The first sensor outputs an activation signal in response to detection of the magnetic field. The control unit is activated in response to the activation signal output from the first sensor to activate the clock and the second sensor. The clock generates a clock count value. The second sensor measures a physical quantity related to the movement of the foot. The data generation unit generates sensor data using the physical quantity measured by the second sensor. The data generation unit generates measurement data associated with the clock count value at the timing when the physical quantity is measured and the sensor data. The storage unit stores the generated measurement data. The output unit outputs the measurement data stored in the storage unit.

The gait measurement device of the present example embodiment starts measurement of a physical quantity related to movement of the foot by the second sensor in response to detection of the magnetic field by the first sensor. Therefore, the gait measurement device of the present example embodiment can start the measurement of the gait in accordance with the walking motion of the user without communicating with the outside.

In one aspect of the present example embodiment, the first sensor outputs an activation signal in response to detection of a magnetic field generated by a magnetic tape installed in advance as a reference line serving as a start line for gait measurement. For example, according to the present aspect, the measurement of the gait can be started according to the walking motion of the user without communicating with the outside by the magnetic field generated by the magnetic tape installed as the reference line. For example, an estimation system including the gait measurement device of the present example embodiment and the magnetic tape may be constructed.

In one aspect of the present example embodiment, the first sensor outputs an activation signal in response to detection of a magnetic field generated by energization to an electric wire installed in advance as a reference line serving as a start line of gait measurement. For example, according to the present aspect, the measurement of the gait can be started according to the walking motion of the user without communicating with the outside by the magnetic field generated by the energization of the electric wire installed as the reference line. According to the present aspect, the clocks of the gait measurement device mounted on the footwear of both feet can be synchronized. For example, an estimation system including the gait measurement device of the present example embodiment and the electric wire may be constructed.

A data generation unit according to an aspect of the present example embodiment includes an acquisition unit, a conversion unit, a normalization unit, an extraction unit, and a data output unit. The acquisition unit acquires the physical quantity measured by the second sensor and the clock count value output from the clock. The conversion unit converts the physical quantity into sensor data of digital data, and associates the converted sensor data with a clock count value. The normalization unit normalizes the time-series data of the sensor data. The extraction unit extracts a feature amount regarding walking from the normalized time-series data of the sensor data. The data output unit outputs the extracted feature amount as measurement data. According to the present aspect, the feature amount extracted using the physical quantity measured by the second sensor can be generated as the measurement data. The extracted feature amount can be used for estimation of a physical condition or the like.

In general walking, a period of one step is about one second. It is difficult to match the time of the left and right feet with an error of 10 milliseconds or less. In a case where the measurement cycle is 100 hertz, there is only one point difference of 10 milliseconds, but this may cause a large error in the calculation of the gait parameter. If the time of the left and right feet is shifted, the data measured for the left and right feet may be interchanged. In the case of a healthy person, even if the time of the left and right legs deviates by about 10 milliseconds, a large error does not occur in the calculated gait parameter. However, in a person whose right and left balance in walking is deviated, the gait parameter cannot be accurately measured unless the time of the right and left feet is synchronized. In the present example embodiment, the time of the left and right feet can be accurately synchronized. For example, if the right and left times can be synchronized, the double support time (both-leg support period) can be actually measured. If the right and left times can be synchronized, the falling risk and the like can be estimated more accurately.

Second Example Embodiment

Next, an estimation system according to a second example embodiment will be described with reference to the drawings. The estimation system of the present example embodiment includes the measurement device of the first example embodiment. The estimation system of the present example embodiment executes data processing regarding the physical condition of the user using the feature amount (sensor data) output from the measurement device.

(Configuration)

Figure 11:
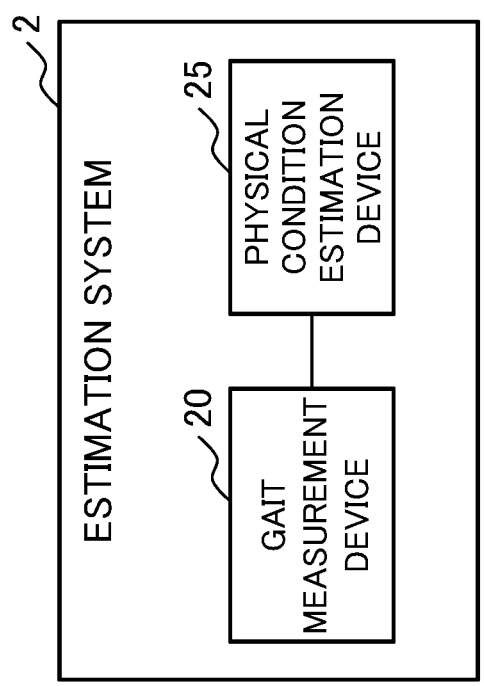
FIG. 11 is a block diagram illustrating an example of a configuration of an estimation system in this disclosure.

FIG. 11 is a block diagram illustrating an example of a configuration of an estimation system 2 according to the present example embodiment. The estimation system 2 includes a gait measurement device 20 and a physical condition estimation device 25. In the present example embodiment, it is assumed that the physical condition estimation device 25 is installed in a mobile terminal carried by a user.

The gait measurement device 20 has the same configuration as the gait measurement device 10 according to the first example embodiment. The gait measurement device 20 is installed on the user's footwear. The gait measurement device 20 starts the measurement of the physical quantity related to the movement of the foot in response to the detection of the magnetic field. For example, the gait measurement device 20 detects a magnetic field generated by magnetism of a magnetic tape installed in advance. For example, the gait measurement device 20 detects a magnetic field generated by a current flowing through an electric wire installed in advance.

The gait measurement device 20 measures an angular velocity and acceleration as physical quantities related to the movement of the foot. The gait measurement device 20 detects a feature amount regarding walking using the measured physical quantities. The gait measurement device 20 transmits the detected feature amount regarding walking to the physical condition estimation device 25. For example, the gait measurement device 20 transmits the feature amount in the period of the swing phase. For example, the gait measurement device 20 transmits the feature amount for each step. For example, the gait measurement device 20 may transmit the feature amount for each gait cycle. The gait measurement device 20 may collectively transmit feature amounts of a plurality of gait cycles.

The feature amount transmitted from the gait measurement device 20 is received by a mobile terminal (not illustrated) carried by the user. The gait measurement device 20 may transmit the gait parameter via a wire such as a cable, or may transmit the gait parameter via wireless communication. For example, the gait measurement device 20 is configured to transmit the gait parameter via a wireless communication function (not illustrated) conforming to a standard such as Bluetooth (registered trademark). The communication function of the gait measurement device 20 may conform to a standard other than Bluetooth (registered trademark).

A mobile terminal (not illustrated) is a communication device that can be carried by a user. For example, the mobile terminal is a portable communication device having a communication function, such as a smartphone, a smart watch, or a mobile phone. The mobile terminal receives the feature amount related to walking from the gait measurement device 20. For example, the mobile terminal processes the received feature amount by the physical condition estimation device 25 installed in the mobile terminal. For example, in a case where the physical condition estimation device 25 is mounted on a server (not illustrated) or a cloud (not illustrated), the mobile terminal transmits the received feature amount to the server or the cloud on which the physical condition estimation device 25 is mounted.

The physical condition estimation device 25 acquires a feature amount regarding walking of the user from the gait measurement device 20. The physical condition estimation device 25 executes data processing regarding the physical condition according to the walking of the user using the acquired feature amount.

For example, the physical condition estimation device 25 determines the symmetry of walking of the user by using the feature amount regarding walking. For example, the physical condition estimation device 25 estimates the degree of progression of the hallux of the user using the feature amount regarding walking. For example, the physical condition estimation device 25 uses the feature amount regarding walking to perform personal identification of the user or personal authentication of the user. For example, the physical condition estimation device 25 calculates the step length and the stride length of the user using the feature amount regarding walking. For example, the physical condition estimation device 25 estimates the degree of pronation/supination of the user using the feature amount regarding walking. For example, the physical condition estimation device 25 performs measurement regarding the lower limb of the user using the feature amount regarding walking. The data processing by the physical condition estimation device 25 is not limited to the example described herein as long as the feature amount acquired from the gait measurement device 20 is used. A specific method of data processing by the physical condition estimation device 25 will not be described.

The physical condition estimation device 25 outputs a result of data processing. For example, the physical condition estimation device 25 displays the result of the data processing on the screen of the mobile terminal in which the physical condition estimation device 25 is installed. For example, the physical condition estimation device 25 displays the numerical value of the gait parameter calculated using the feature amount received from the gait measurement device 20 on the screen of the mobile terminal in real time. For example, the physical condition estimation device 25 displays the time-series data of the gait parameter calculated using the feature amount received from the gait measurement device 20 on the screen of the mobile terminal in real time. For example, the physical condition estimation device 25 displays information regarding the physical condition of the user estimated using the feature amount received from the gait measurement device 20 and information corresponding to the estimated physical condition on the screen of the mobile terminal. For example, the physical condition estimation device 25 may transmit the received gait feature amount to a server, a cloud, or the like. The use of the feature amount received by the mobile terminal is not particularly limited.

Figure 12:
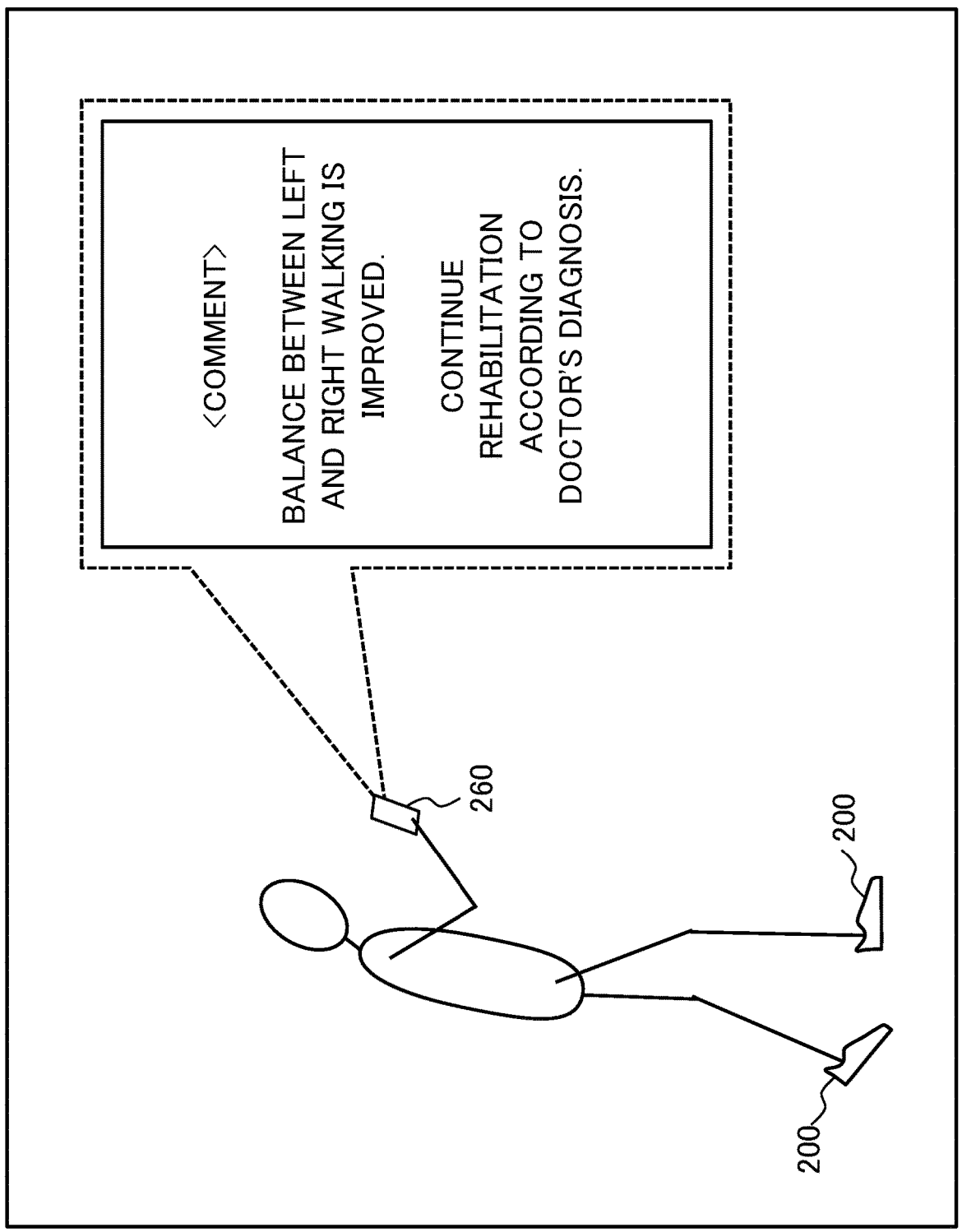
FIG. 12 is a conceptual diagram illustrating an example of output of information according to the estimation result of the physical condition by the estimation system in this disclosure.

FIG. 12 is an example of displaying information according to walking of the user on the screen of the mobile terminal 260 carried by the user. In the example of FIG. 12, the user walks while wearing shoes 200 on which the gait measurement device 20 is installed. In the example of FIG. 12, information corresponding to the physical condition of the user estimated using the feature amount received from the gait measurement device 20 is displayed on the screen of the mobile terminal 260. In the example of FIG. 12, information according to the physical condition of "The balance between the left and right walking is improved." is displayed on the screen of the mobile terminal 260 according to the gait parameter calculated using the feature amount. In the example of FIG. 12, recommendation information of "Continue rehabilitation according to doctor's diagnosis." is displayed on the screen of the mobile terminal 260 regarding information according to the physical condition. The user who has confirmed the information displayed on the screen of the mobile terminal 260 can improve his/her health condition by continuing the rehabilitation according to the diagnosis of the doctor according to the recommendation information.

For example, the physical condition estimation device 25 estimates a symptom of a foot and a recovery degree from an injury according to variations in the left and right stride lengths. For example, in a case where the variation in the left and right stride lengths is larger than before, there is a possibility that the symptom is progressing or the injury is getting worse. In such a case, there is a possibility that the symptom or injury of the user can be improved by displaying the information recommending the medical examination or the treatment on the screen of the mobile terminal 260 of the user. For example, when the variation in the left and right stride lengths is smaller than before, there is a possibility that the subject tends to recover from symptoms or injuries. In such a case, if information indicating that the user tends to recover is displayed on the screen of the mobile terminal 260 of the user, there is a possibility that motivation of the user such as rehabilitation is improved.

For example, in a case where the influence of a sprain or an old injury of the foot affects the movement of the ankle, the influence is reflected on the value of the ground strike angle/toe off angle and the balance between the right and left. Therefore, it is possible to verify the degree and state of recovery of a sprain or an old injury according to the magnitude of the value of the ground strike angle/toe off angle and the balance between the left and right. For example, in a case where a value of the ground strike angle/toe off angle of a foot having a sprain or an old injury is less than a predetermined value, there is a possibility that a symptom of the user can be improved by displaying information recommending an examination or a treatment on a screen of the mobile terminal 260 of the user. For example, in a case where a value of the ground strike angle/toe off angle of a leg having a sprain or an old injury exceeds a predetermined value, if information indicating that the leg tends to recover is displayed on the screen of the mobile terminal 260 of the user, there is a possibility that the quality of life of the user is improved.

For example, when a foot raising height associated with the absolute value of the clearance decreases, the risk of stumbling and falling over due to a step or the like increases. Therefore, the risk of falling can be verified by verifying the foot raising height. For example, in a case where the foot raising height falls below a predetermined value, if information recommending an examination, treatment, or training is displayed on the screen of the mobile terminal 260 of the user, there is a possibility that the user takes an action that can avoid the falling risk. For example, in a case where the foot raising height exceeds a predetermined value, if information indicating that the user is in a healthy walking state is displayed on the screen of the mobile terminal 260 of the user, there is a possibility that the quality of life of the user is improved.

For example, in a situation where the patient is visiting a hospital for rehabilitation of leg symptoms or injuries, the patient walks in front of a doctor and the doctor determines the state of the leg. However, in front of the doctor, there may be a case where an aspect different from daily walking is exhibited depending on the psychological state of the user. Therefore, it is desirable that the physical condition can be determined based on numerical values and indices measured in daily life. The estimation system of the present example embodiment can measure/estimate a numerical value and an index indicating the state of the foot in daily life, and thus, can easily obtain accurate determination without being affected by the psychological state of the user. Since the estimation system of the present example embodiment can grasp the state of the user in real time in daily life, even in a case where a symptom or a medical condition rapidly deteriorates, the estimation system can respond flexibly by making emergency contact to a hospital or the like.

As described above, the estimation system of the present example embodiment includes the gait measurement device and the physical condition estimation device. The gait measurement device is the gait measurement device according to the first example embodiment. The physical condition estimation device acquires measurement data output from the gait measurement device. The physical condition estimation device estimates a physical condition using the acquired measurement data.

For example, the physical condition estimation device estimates the physical condition of the user walking while wearing the footwear on which the gait measurement device is mounted by data processing using the gait parameter calculated using the feature amount. For example, the physical condition estimation device causes information regarding the estimated physical condition of the user to be displayed on a screen of the terminal device visually recognizable by the user. For example, the physical condition estimation device displays information regarding the estimated physical condition of the user on a screen of a terminal device visually recognizable by a person who verifies the physical condition of the user.

The estimation system of the present example embodiment can start the measurement of the gait in accordance with the walking motion of the user without communicating with the outside of the gait measurement device. Therefore, according to the estimation system of the present example embodiment, the physical condition of the user can be estimated using the sensor data related to the movement of the foot in which the measurement is started without communicating with the outside.

Third Example Embodiment

Next, a gait measurement device according to a third example embodiment will be described with reference to the drawings. The gait measurement device of the present example embodiment has a configuration in which the gait measurement device according to the first example embodiment is simplified.

Figure 13:
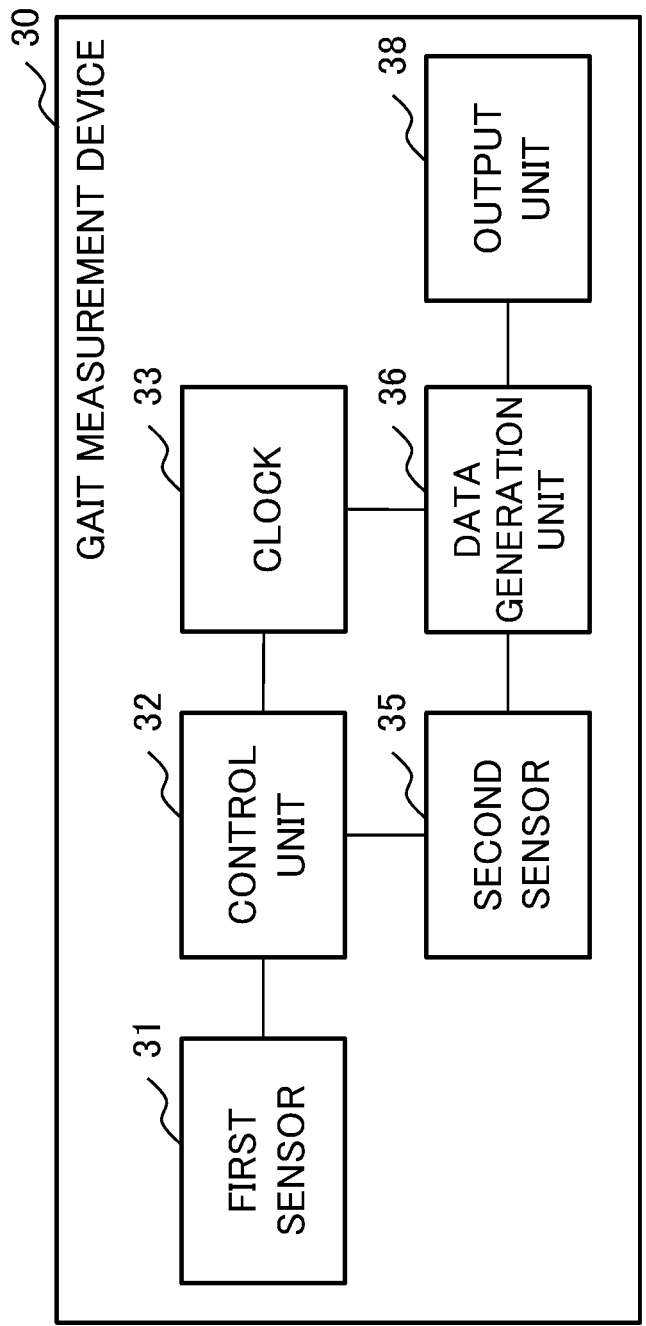
FIG. 13 is a block diagram illustrating an example of a configuration of a gait measurement device in this disclosure and FIG. 14 is a block diagram illustrating an example of a hardware configuration that executes control and processing in this disclosure.

FIG. 13 is a block diagram illustrating an example of a configuration of a gait 10 measurement device 30 according to the present example embodiment. The gait measurement device 30 includes a first sensor 31, a control unit 32, a clock 33, a second sensor 35, a data generation unit 36, and an output unit 38.

The first sensor 31 outputs an activation signal in response to detection of the magnetic field. The control unit 32 is activated in response to an activation signal output from the first sensor to activate the clock and the second sensor. The clock 33 generates a clock count value. The second sensor 35 measures a physical quantity related to the movement of the foot. The data generation unit 36 generates sensor data using the physical quantity measured by the second sensor. The data generation unit 36 generates measurement data associated with the clock count value at the timing when the physical quantity is measured and the sensor data. The output unit 38 outputs the measurement data.

The gait measurement device of the present example embodiment starts measurement of a physical quantity related to movement of the foot by the second sensor in response to detection of the magnetic field by the first sensor. Therefore, the gait measurement device of the present example embodiment can start the measurement of the gait in accordance with the walking motion of the user without communicating with the outside.

(Hardware)

Next, a hardware configuration for executing control and processing according to each example embodiment of the present disclosure will be described with reference to the drawings. Here, an example of such a hardware configuration is an information processing device 90 (computer) in FIG. 14. The information processing device 90 in FIG. 14 is a configuration example for executing the control and processing of each example embodiment, and does not limit the scope of the present disclosure.

Figure 14:
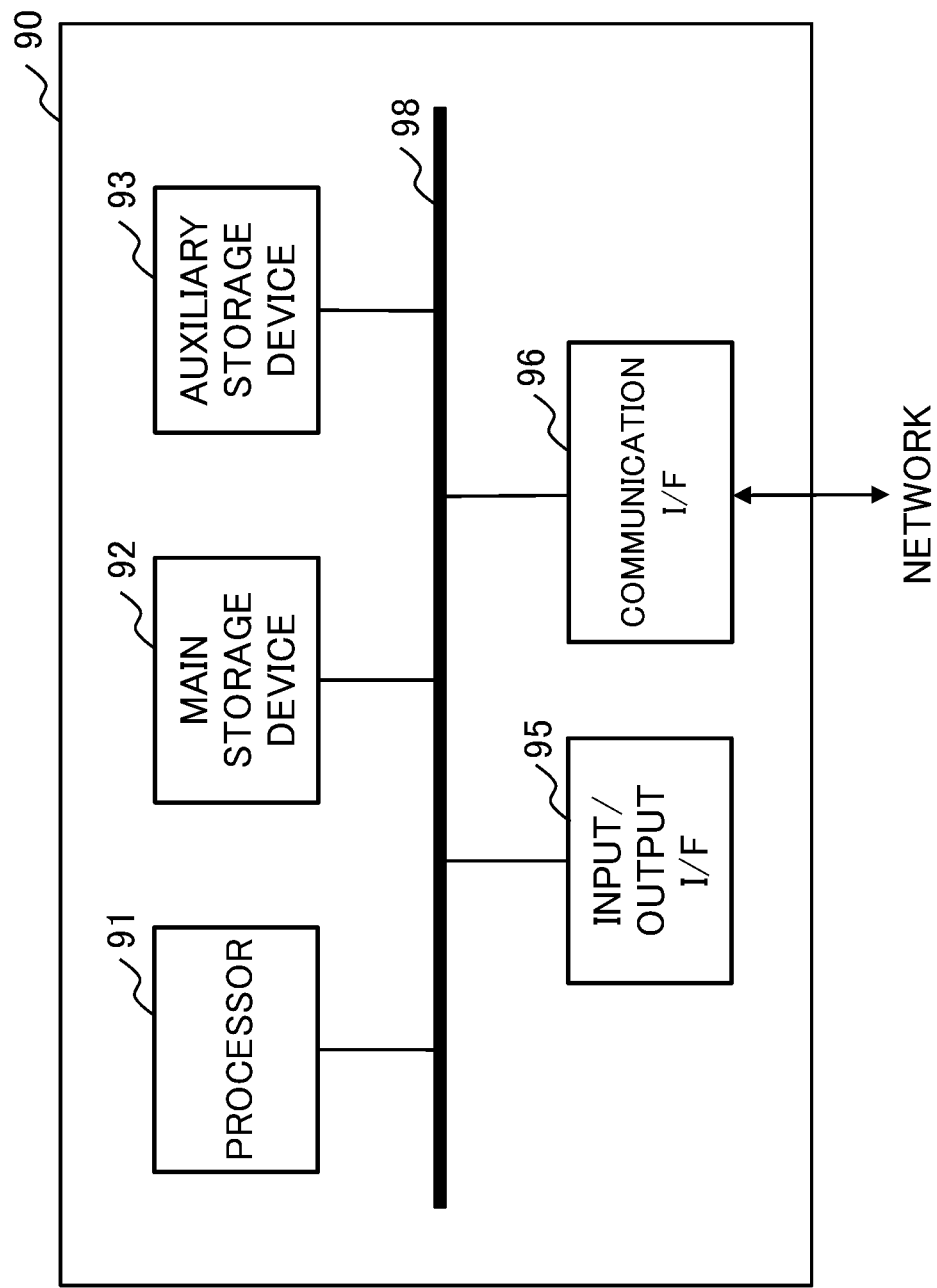

As illustrated in FIG. 14, the information processing device 90 includes a processor 91, a main storage device 92, an auxiliary storage device 93, an input/output interface 95, and a communication interface 96. In FIG. 14, the interface is abbreviated as an I/F. The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops a program (instruction) stored in the auxiliary storage device 93 or the like in the main storage device 92. For example, the program is a software program for executing the control and processing of each example embodiment. The processor 91 executes the program developed in the main storage device 92. The processor 91 executes the control and processing according to each example embodiment by executing the program.

The main storage device 92 has an area in which a program is developed. A program stored in the auxiliary storage device 93 or the like is developed in the main storage device 92 by the processor 91. The main storage device 92 is implemented by, for example, a volatile memory such as a dynamic random access memory (DRAM). A nonvolatile memory such as a magneto resistive random access memory (MRAM) may be configured and added as the main storage device 92.

The auxiliary storage device 93 stores various data such as programs. The auxiliary storage device 93 is implemented by a local disk such as a hard disk or a flash memory. Various data may be stored in the main storage device 92, and the auxiliary storage device 93 may be omitted.

The input/output interface 95 is an interface for connecting the information processing device 90 and a peripheral device. The communication interface 96 is an interface for connecting to an external system or device through a network such as the Internet or an intranet based on a standard or a specification. The input/output interface 95 and the communication interface 96 may be shared as an interface connected to an external device.

An input device such as a keyboard, a mouse, or a touch panel may be connected to the information processing device 90 as necessary. These input devices are used to input information and settings. When a touch panel is used as the input device, a screen having a touch panel function serves as an interface. The processor 91 and the input device are connected via the input/output interface 95.

The information processing device 90 may be provided with a display device for displaying information. In a case where a display device is provided, the information processing device 90 may include a display control device (not illustrated) for controlling display of the display device. The display device may be connected to the information processing device 90 via the input/output interface 95.

The information processing device 90 may be provided with a drive device. The drive device mediates reading of data and a program stored in a recording medium and writing of a processing result of the information processing device 90 to the recording medium between the processor 91 and the recording medium (program recording medium). The information processing device 90 and the drive device are connected via an input/output interface 95.

The above is an example of the hardware configuration for enabling the control and processing according to each example embodiment of the present disclosure. The hardware configuration of FIG. 14 is an example of a hardware configuration for executing the control and processing of each example embodiment, and does not limit the scope of the present disclosure. A program for causing a computer to execute the control and processing according to each example embodiment is also included in the scope of the present disclosure.

Further, a program recording medium in which the program according to each example embodiment is recorded is also included in the scope of the present disclosure. The recording medium can be achieved by, for example, an optical recording medium such as a compact disc (CD) or a digital versatile disc (DVD). The recording medium may be implemented by a semiconductor recording medium such as a universal serial bus (USB) memory or a secure digital (SD) card. The recording medium may be implemented by a magnetic recording medium such as a flexible disk, or another recording medium. When a program executed by the processor is recorded in a recording medium, the recording medium is associated to a program recording medium.

The components of each example embodiment may be arbitrarily combined. The components of each example embodiment may be implemented by software. The components of each example embodiment may be implemented by a circuit.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A gait measurement device comprising:
a first sensor that outputs an activation signal in response to detection of a magnetic field;
a clock that generates a clock count value;
a second sensor that measures a physical quantity related to movement of a foot;
a controller configured to be activated in response to the activation signal output from the first sensor to activate the clock and the second sensor;
a memory storing instructions; and
a processor connected to the memory and configured to execute the instructions to:

generate sensor data using the physical quantity measured by the second sensor;

generate measurement data associated with the clock count value and the sensor data at a timing when the physical quantity is measured; and output the measurement data.

2. The gait measurement device according to claim 1, wherein the first sensor outputs the activation signal in response to detection of a magnetic field generated by a magnetic tape installed in advance as a reference line serving as a start line of gait measurement.

3. An estimation system comprising:

the gait measurement device according to claim 2; and a magnetic tape that is installed in advance as a reference line serving as a start line for gait measurement.

4. The gait measurement device according to claim 1, wherein the first sensor outputs the activation signal in response to detection of a magnetic field generated by energization to an electric wire installed in advance as a reference line serving as a start line of gait measurement.

5. An estimation system comprising:

the gait measurement device according to claim 4; and an electric wire that is installed in advance as a reference line serving as a start line for gait measurement.

6. The gait measurement device according to claim 1, wherein the second sensor includes an acceleration sensor that detects acceleration; and an angular velocity sensor that detects an angular velocity.

7. The gait measurement device according to claim 1, wherein the processor is configured to execute the instructions to acquire the physical quantity measured by the second sensor and the clock count value output from the clock, convert the physical quantity into the sensor data of digital data and associates the converted sensor data with the clock count value, normalize time-series data of the sensor data, extract a feature amount regarding walking from normalized time-series data of the sensor data, and output the extracted feature amount as the measurement data.

8. An estimation system comprising:

the gait measurement device according to claim 1; and a physical condition estimation device that acquires measurement data output from the gait measurement device and estimates a physical condition using the acquired measurement data.

9. A gait measurement method using a gait measurement device including a first sensor that outputs an activation signal in response to detection of a magnetic field, a clock that generates a clock count value, and a second sensor that measures a physical quantity related to movement of a foot, the gait measurement method causing a computer to execute:

activating the clock and the second sensor in response to the activation signal output from the first sensor;

generating sensor data using the physical quantity measured by the second sensor;

generating measurement data associated with the clock count value and the sensor data at a timing when the physical quantity is measured; and outputting the measurement data.

10. A non-transitory recording medium recording a program for gait measurement using a gait measurement device including a first sensor that outputs an activation signal in response to detection of a magnetic field, a clock that generates a clock count value, and a second sensor that measures a physical quantity related to movement of a foot, the program causing a computer to execute:

activating the clock and the second sensor in response to the activation signal output from the first sensor;

generating sensor data using the physical quantity measured by the second sensor;

generating measurement data associated with the clock count value and the sensor data at a timing when the physical quantity is measured; and outputting the measurement data.

* * * * *